US 9,046,006 B2

(12) United States Patent
Ritter

(10) Patent No.: US 9,046,006 B2
(45) Date of Patent: Jun. 2, 2015

(54) DUAL CYCLE RANKINE W+ASTE HEAT RECOVERY CYCLE

(75) Inventor: Jason Ritter, Fall City, WA (US)

(73) Assignee: PACCAR Inc, Bellevue, WA (US)

( * ) Notice: Subject to any disclaimer, the term of this patent is extended or adjusted under 35 U.S.C. 154(b) by 280 days.

(21) Appl. No.: 12/819,904

(22) Filed: Jun. 21, 2010

(65) Prior Publication Data

US 2011/0308253 A1 Dec. 22, 2011

(51) Int. Cl.
| | |
|---|---|
| F01K 23/10 | (2006.01) |
| F02G 3/00 | (2006.01) |
| F01K 23/04 | (2006.01) |
| F01K 9/00 | (2006.01) |
| F01K 23/06 | (2006.01) |
| F22B 1/18 | (2006.01) |

(52) U.S. Cl.
CPC .............. *F01K 23/065* (2013.01); *F01K 23/04* (2013.01); *F22B 1/1807* (2013.01)

(58) Field of Classification Search
CPC ............................... F01K 23/04; F22B 1/1807
USPC ........... 60/615, 616, 618, 620, 660, 663, 664, 60/655
See application file for complete search history.

(56) References Cited

U.S. PATENT DOCUMENTS

| | | | | |
|---|---|---|---|---|
| 3,830,062 | A | * | 8/1974 | Morgan et al. .................. 60/618 |
| 3,888,084 | A | * | 6/1975 | Hawkins ......................... 60/614 |
| 3,913,699 | A | | 10/1975 | Dyer |
| 3,945,210 | A | * | 3/1976 | Chapin ............................ 60/618 |
| 4,031,705 | A | * | 6/1977 | Berg ............................... 60/615 |
| 4,249,385 | A | * | 2/1981 | Bissell ............................ 60/674 |
| 4,351,155 | A | * | 9/1982 | Anderson et al. ............... 60/618 |
| 4,393,656 | A | | 7/1983 | Anderson |
| 4,458,493 | A | * | 7/1984 | Amir et al. ...................... 60/662 |
| 5,121,607 | A | | 6/1992 | George, Jr. |
| 5,195,881 | A | | 3/1993 | George, Jr. |
| 5,241,817 | A | | 9/1993 | George, Jr. |

(Continued)

FOREIGN PATENT DOCUMENTS

| | | |
|---|---|---|
| JP | 61132710 A | 6/1986 |
| JP | 61171808 A | 8/1986 |

OTHER PUBLICATIONS

Australian Patent Examination Report No. 1, mailed Sep. 20, 2014, issued in corresponding Australian Application No. 2011202917, filed Jul. 17, 2011, 3 pages.

*Primary Examiner* — Christopher Jetton
*Assistant Examiner* — Ngoc T Nguyen
(74) *Attorney, Agent, or Firm* — Christensen O'Connor Johnson Kindness PLLC

(57) ABSTRACT

A dual cycle waste heat recovery system includes a high-temperature circuit that utilizes a first working fluid. The first working fluid is heated by a first waste heat source and then expanded through a first expander to produce power. The heat recovery system further includes a low-temperature circuit that utilizes a second working fluid. The low-temperature circuit also includes a first heat exchanger for heating the second working fluid with heat from the first working fluid and a second heat exchanger for heating the second working fluid with heat from a second waste heat source. A control valve selectively controls the flow of the second working fluid to each of the first and second heat exchangers according to a predetermined set of parameters. An expander receives the second working fluid from the first and second heat exchangers and expands the second working fluid to produce power.

12 Claims, 2 Drawing Sheets

(56) References Cited

U.S. PATENT DOCUMENTS

| | | |
|---|---|---|
| 5,634,339 A | 6/1997 | Lewis |
| 5,860,279 A * | 1/1999 | Bronicki et al. ............... 60/655 |
| 5,873,250 A | 2/1999 | Lewis |
| 6,035,643 A * | 3/2000 | Rosenblatt .................... 60/651 |
| 6,450,283 B1 | 9/2002 | Taggett |
| 6,497,090 B2 * | 12/2002 | Bronicki et al. ............... 60/39.6 |
| 6,651,433 B1 | 11/2003 | George, Jr. |
| 6,834,503 B2 | 12/2004 | Freymann |
| 6,910,333 B2 * | 6/2005 | Minemi et al. ................. 60/618 |
| 6,923,009 B2 * | 8/2005 | Kudaravalli ................... 62/51.1 |
| 7,055,328 B2 * | 6/2006 | Huengerle et al. ............. 60/660 |
| 7,174,715 B2 * | 2/2007 | Armitage et al. .............. 60/646 |
| 7,942,001 B2 * | 5/2011 | Radcliff et al. ................ 60/651 |
| 7,997,076 B2 * | 8/2011 | Ernst .............................. 60/616 |
| 8,096,128 B2 * | 1/2012 | Held et al. ..................... 60/645 |
| 2002/0007636 A1 * | 1/2002 | Hay ............................... 60/618 |
| 2005/0229595 A1 | 10/2005 | Hoetger |
| 2008/0110171 A1 * | 5/2008 | Schmeltz ....................... 60/616 |
| 2009/0277173 A1 * | 11/2009 | Ernst et al. .................... 60/616 |
| 2010/0319346 A1 * | 12/2010 | Ast et al. ....................... 60/616 |
| 2010/0326076 A1 * | 12/2010 | Ast et al. ....................... 60/671 |
| 2012/0000201 A1 * | 1/2012 | Ast et al. ....................... 60/652 |

* cited by examiner

DUAL CYCLE RANKINE WASTE HEAT RECOVERY CYCLE

FIELD OF THE INVENTION

The present invention relates generally to waste heat recovery systems for internal combustion engines and, more particularly, to a waste heat recovery system for a vehicle, wherein the system utilizes dual Rankine cycles.

BACKGROUND

Internal combustion engines are known to convert a relatively small amount of the energy from fuel into usable energy. In a typical internal combustion engine, fuel is mixed with air, compressed within one or more combustion chambers, and ignited. The expansion of the ignited air/fuel mixture drives pistons to produce usable power. The exothermic combustion of the air/fuel mixture also generates a large amount of heat, the majority of which is lost as the high-temperature products of combustion are exhausted into the atmosphere. Exhaust heat recovery systems are known in the art as a way to convert heat that would otherwise be lost in the engine exhaust into usable energy.

While the exhaust gas from the combustion chamber represents the greatest source of recoverable waste heat, most vehicles have several other secondary sources of recoverable waste heat, although the operating temperatures of these additional heat sources are typically lower than that of the engine exhaust. Exemplary additional heat sources include engine cooling systems, oil coolers, transmission fluid coolers, exhaust gas recirculation (EGR) systems, low-temperature portions of an exhaust gas heat recovery cycle, and any other suitable source capable of providing recoverable heat.

The exhaust from the engine provides a reliable source of recoverable heat; however, the heat available from each of the secondary heat sources can vary greatly according to vehicle operating conditions and which vehicle systems are in use at a particular time. As a result, the secondary heat source that provides optimal heat recovery can change as operating conditions change.

SUMMARY

A first exemplary embodiment of a disclosed dual cycle waste heat recovery system includes a high-temperature circuit that utilizes a first working fluid. The first working fluid is heated by a first waste heat source and then expanded through a first expander to produce power. The heat recovery system further includes a low-temperature circuit that utilizes a second working fluid. The low-temperature circuit also includes a first heat exchanger for heating the second working fluid with heat from the first working fluid and a second heat exchanger for heating the second working fluid with heat from a second waste heat source. A control valve selectively controls the flow of the second working fluid to each of the first and second heat exchangers according to a predetermined set of parameters. An expander receives the second working fluid from the first and second heat exchangers and expands the second working fluid to produce power.

A second exemplary embodiment of a disclosed dual cycle waste heat recovery system includes a high-temperature circuit and a low-temperature circuit. The high-temperature circuit uses a first working fluid and includes (1) a first heat exchanger for heating the first working fluid, (2) a first expander for receiving the first working fluid from the first heat exchanger and expanding the first working fluid to produce power, and (3) a second heat exchanger for receiving the first working fluid from the first expander and cooling the first working fluid. The low-temperature circuit uses a second working fluid and includes a valve for selectively directing the second working fluid to be heated by one of the second heat exchanger and a third heat exchanger. The low-temperature circuit also includes a second expander for receiving the second working fluid from the one of the second heat exchanger and third heat exchanger, and expanding the second working fluid to produce power. A controller controls the valve to direct the second working fluid selectively to one of the second and third heat exchangers according to a predetermined set of parameters.

A third exemplary embodiment of a disclosed dual cycle waste heat recovery system includes a first heat recovery circuit that uses a first working fluid and a second heat recovery circuit that uses a second working fluid. The first heat recovery circuit has (1) a first heat exchanger for heating the first working fluid, (2) a first expander for receiving the first working fluid from the first heat exchanger and expanding the first working fluid to produce power, and (3) a second heat exchanger for receiving the first working fluid from the first expander and cooling the first working fluid. The second heat recovery circuit includes (1) a third heat exchanger for heating the second working fluid with heat from a first heat source, (2) a fourth heat exchanger for heating the second working fluid with heat from a second heat source, and (3) a valve. The valve selectively directs the second working fluid to the one of the second heat exchanger, the third heat exchanger, and the fourth heat exchanger according to which heat source has the highest temperature. The first working fluid acts as a heat source for the second working fluid in the second heat exchanger. The second heat recovery circuit also includes a second expander for receiving the second working fluid from the one of the second heat exchanger, the third heat exchanger, and the fourth heat exchanger and expanding the second working fluid to produce power.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present disclosure is generally directed to a system that converts waste heat from an internal combustion engine into useful mechanical or electrical energy. In one described embodiment, the system is adapted to convert waste heat from a vehicle's internal combustion engine, as well as heat from other vehicle systems. Recovered mechanical energy can be provided to the vehicle drive train via a known transmission to improve vehicle efficiency, while electrical energy generated by the system can power various vehicle systems or be stored for later use. It should be appreciated that the recovered mechanical and or electrical energy can be used or stored in any number of suitable ways. Accordingly, the exemplary uses and storage means described herein should not be considered limiting.

Figure 1:
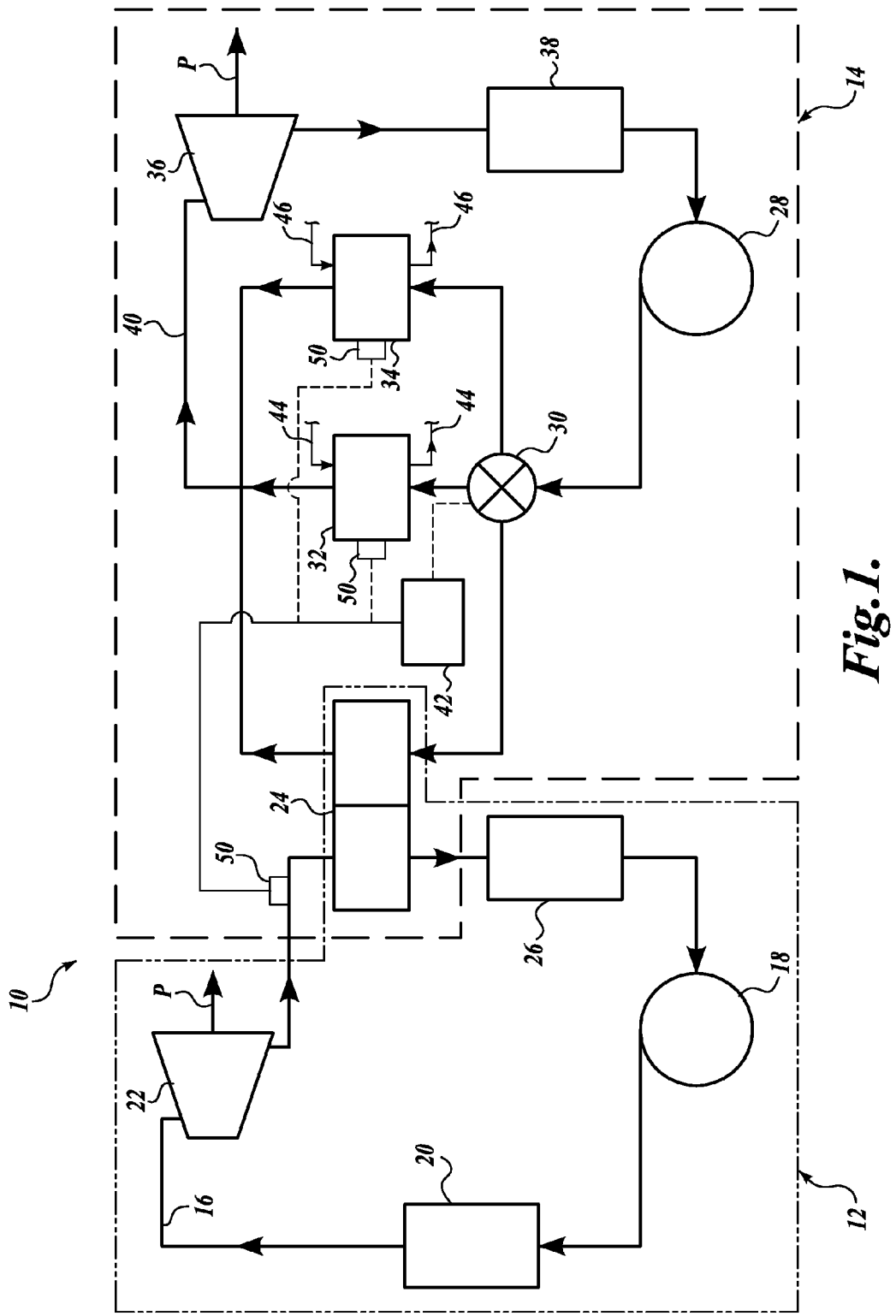
FIG. 1 shows a schematic diagram of an exemplary embodiment of a dual cycle heat recovery system.

Referring to FIG. 1, an exemplary embodiment of a dual cycle heat recovery system 10 is shown. The system uses a first Rankine cycle, which defines a hot cycle 12, in cooperation with a second Rankine cycle, which defines a cold cycle 14. The hot cycle 12 utilizes a first working fluid 16 that is movable through a circuit formed by the following components placed in fluid connection: a pump 18, a first heat exchanger 20, a turbine 22, a second heat exchanger 24, and a condenser 26.

The hot cycle 12 operates as a known conventional Rankine cycle. The pump 18 pressurizes the working fluid 16 from a low-pressure liquid state at the pump inlet to a high-pressure liquid state at the pump outlet.

The pressurized working fluid 16 passes through the first heat exchanger 20, which acts as a boiler to vaporize the working fluid 16 into a dry saturated vapor. The first heat exchanger vaporizes the working fluid using waste heat from the vehicle. A high-temperature heat source, such as engine exhaust, is preferable, although other heat sources may be suitable depending upon the optimal temperature range of the working fluid 16.

The vaporized high-pressure working fluid 16 is expanded through the turbine 22 to create power P. In one embodiment, the turbine 22 output is mechanical power that is supplied to the vehicle drive system or any other suitable system by a known transmission. In other embodiments, the turbine 22 output is electrical power that is supplied to various electrical systems, or is stored in batteries to be used at a later time. It will be appreciated that power P produced by the turbine 22 can be used by any number of systems that require a power supply. Accordingly, embodiments that enable the power generated by the turbine 22 to be supplied to such systems are contemplated and should be considered within the scope of the present disclosure.

Working fluid 16 exiting the turbine 22 has a lower temperature and pressure than working fluid entering the turbine. The low-pressure working fluid 16 exiting the turbine 22 is passed through the second heat exchanger 24, which further cools the working fluid. As explained in further detail below, heat removed from the working fluid 16 by the second heat exchanger 24 is made available to the cold cycle 14 of the heat recovery system 10. The low-pressure working fluid 16 is then passed through a condenser 26, thereby condensing the vaporized working fluid into a saturated liquid before returning the working fluid to the pump 18.

Although the disclosed embodiment of the hot cycle 12 has the configuration of a typical Rankine cycle, it should be appreciated that various alternate embodiments are possible. In one alternate embodiment, the second heat exchanger 24 also acts as the condenser 26. In another alternate embodiment, the hot cycle 12 includes a reheat feature, wherein vapor exiting the turbine is reheated by a boiler before being expanded through a second, lower temperature turbine to generate additional power. In yet another embodiment, the hot cycle 12 is based on a regenerative Rankine cycle, wherein heat is taken from the vaporized working fluid exiting the turbine and is used to heat the low-temperature working fluid 16 exiting the condenser 26 or the pump 18. These and other heat recovery cycles are contemplated. In this regard, any heat recovery system capable of (1) converting waste heat into usable energy, and (2) providing heat to power a secondary recovery cycle can be used as the hot cycle, and should be considered within the scope of the present disclosure.

Still referring to FIG. 1, the cold cycle 14 utilizes a second working fluid 40 that is movable through a circuit formed by the following components placed in fluid connection: a pump 28, a valve 30, a plurality of heat exchangers 24, 32 and 34, a turbine 36, and a condenser 38.

Similar to the hot cycle 12, the cold cycle 14 operates as a known conventional Rankine cycle. The pump 28 pressurizes the working fluid 40 from a low-pressure liquid state at the pump inlet to a high-pressure liquid state at the pump outlet.

The pressurized working fluid 40 is selectively directed to one or more of the plurality of heat exchangers 24, 32, and 34 by the valve 30. More specifically, a controller 42 controls the valve 30 to direct the working fluid 40 to the heat exchanger or heat exchangers 24, 32, and/or 34 having the most available heat to heat the working fluid 40.

The amount of heat, i.e., thermal energy, available from each of the plurality of heat exchangers is determined using one or more parameters obtained using a variety of sensors 50. In one embodiment, the sensors 50 are temperature sensors that sense the temperature of the heat source of each heat exchanger. Based on the temperature data from the sensors 50, the controller 42 controls the valve 30 to direct the working fluid 40 to the heat exchanger having the source of thermal energy with the highest temperature.

In another embodiment, the sensors 50 sense the temperature, pressure, and mass flow of the heat source of each heat exchanger. The temperature and pressure of a given heat exchanger heat source are used to determine the enthalpy h of the fluid providing the heat. For example, knowing the temperature, pressure, and thermodynamic properties of the first working fluid 16, the enthalpy h of the first working fluid passing through the heat exchanger 24 can be determined. Multiplying the enthalpy h of the first working fluid 16 by the mass flow of the first working fluid gives the amount of thermal energy available from the first working fluid 16 to heat the second working fluid 40. Similar calculations can be made to determine the amount of thermal energy available from the other heat exchangers 32 and 24.

It should be appreciated that the determination of which heat exchanger has the most available thermal energy for heating the second working fluid can be determined according to a variety of parameters. The use of such alternative parameters is contemplated and should be considered within the scope of the present disclosure. Moreover, it is contemplated that different parameters can be employed for different heat sources, depending upon the operating characteristics of each particular heat source.

The controller 42 controls the valve 30 to direct the working fluid to the one or more heat exchangers that will provide the greatest amount of heat to the cold cycle working fluid 40. In some instances, it will be most efficient for the valve 30 to direct all of the working fluid 40 to the heat exchanger with the hottest "hot side" working fluid. In other instances, it will be more efficient to send some of the working fluid 40 to one heat exchanger, while directing the rest of the working fluid to one or more of the remaining heat exchangers. Such a case may arise when one of the heat exchangers has a high-temperature, low-flow "hot side" working fluid. Such a heat exchanger could efficiently heat a portion of the working fluid 40 up to a certain flow rate; however, above that flow rate, it would be more efficient to direct to the remainder of the working fluid to one or more of the other heat exchangers.

The one or more heat exchangers 24, 32, and 34 through which the working fluid 40 is directed act as boilers to vaporize the working fluid 40 into a dry saturated vapor. The first heat exchanger 20 vaporizes the working fluid using waste heat from the hot cycle 12. The remaining heat exchangers 32 and 34 utilize heat from any number of suitable sources, including but not limited to an exhaust gas recirculation (EGR) system, engine oil, engine coolant, a recuperator, or any other suitable source. For each of these heat sources, it will be appreciated that the heat may be supplied by a flow of a heat source fluid 44 and 46, respectively (exhaust gas, engine oil, engine coolant, working fluid, etc.) associated with that particular heat source. That is, if the heat source is an EGR system, then exhaust gas may be supplied to the heat exchanger to act as a heat source fluid; if the heat source is engine oil, then engine oil may be supplied to the heat exchanger to act as a heat source fluid; if the heat source is engine coolant, then engine coolant may be supplied to the heat exchanger to act as a heat source fluid; etc. Further, although the illustrated embodiment has three heat exchangers to which the valve 30 can direct the working fluid, it should be appreciated that this configuration is exemplary, and any suitable number of heat exchangers can be employed.

The vaporized high-pressure working fluid 40 discharged by the one or more heat exchangers 24, 32, and 34 is recombined and expanded through the turbine 36 to create power P. Similar to the hot cycle turbine 22, the cold cycle turbine 36 is one of several possible embodiments. In one embodiment, the turbine 36 output is mechanical power that is supplied to the vehicle drive system or any other suitable system by a known transmission. In other embodiments, the turbine 36 output is electrical power that is supplied to various electrical systems or is stored in batteries to be used at a later time. It will be appreciated that power P produced by the turbine 36 can be used by any number of systems that require a power supply. Accordingly, embodiments that enable the power generated by the turbine 36 to be supplied to such systems are contemplated and should be considered within the scope of the present disclosure.

Working fluid 40 exiting the turbine 36 has a lower temperature and pressure than working fluid entering the turbine. The low-pressure working fluid 40 is passed through the condenser 38, thereby condensing the vaporized working fluid into a saturated liquid before returning the working fluid to the pump 28.

Although the disclosed embodiment of the cold cycle 14 has the configuration of a typical Rankine cycle, it should be appreciated that various alternate embodiments are possible. In one alternate embodiment, the cold cycle 14 includes a reheat feature, wherein vapor exiting the turbine is reheated by a boiler before being expanded through a second, lower temperature turbine to generate additional power. In another alternate embodiment, the cold cycle 14 is based on a regenerative Rankine cycle, wherein heat is taken from the vaporized working fluid exiting the turbine and is used to heat the low-temperature working fluid 40 exiting the condenser 38 or the pump 28. In yet another embodiment, vapor exiting the turbine 36 is used as a heat source for one of the heat exchangers 32, and 34. These and other heat recovery cycles are contemplated. In this regard, any heat recovery cycle capable of converting waste heat into usable energy can be used as a basis for the cold cycle, and should be considered within the scope of the present disclosure.

Figure 2:
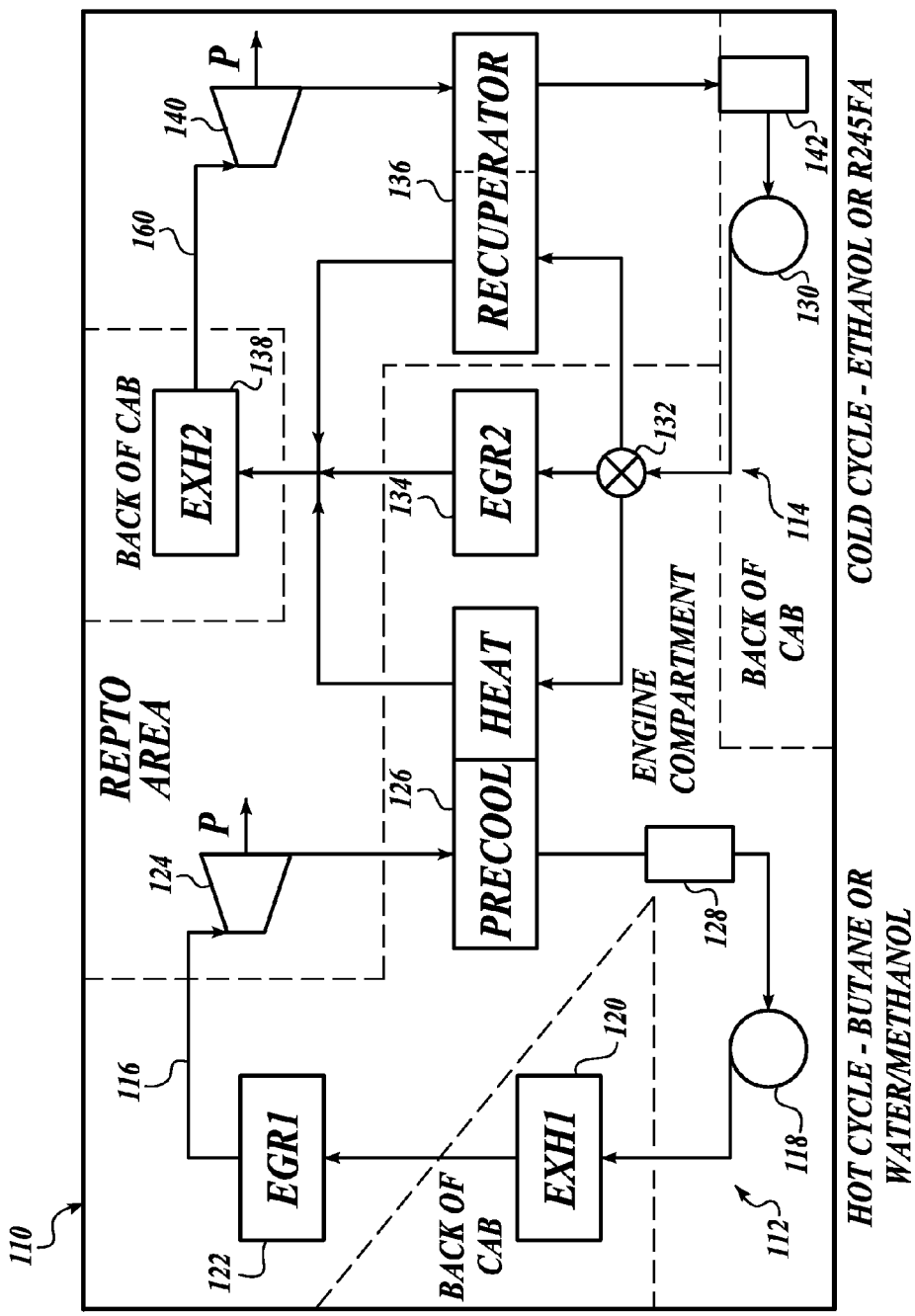
FIG. 2 shows an embodiment of the heat recovery system of FIG. 1 adapted for use on a vehicle.

Referring now to FIG. 2, an exemplary embodiment of the previously described heat recovery system 10 will be described. The heat recovery system 110 includes a hot cycle 112 that utilizes a high-temperature working fluid 116, such as butane, a water/methanol mixture, or any other suitable fluid. The working fluid 116 is pressurized by a pump 118 and then preheated in a heat exchanger 120 using heat from the engine exhaust. The preheated working fluid 116 is next vaporized in a heat exchanger 122 using heat from the EGR system of the vehicle. The vaporized working fluid 116 is expanded through a turbine 124 to drive a high-speed gearbox that provides additional power to the vehicle drive train. The working fluid 116 is then precooled in a heat exchanger 126 so that the heat removed from the working fluid is available to the power the cold cycle 114. The precooled working fluid 116 is condensed in a condenser 128 and returned to the pump 118.

Still referring to FIG. 2, the cold cycle 114 utilizes a low-temperature working fluid 160, such as ethanol, R245FA (1,1,1,3,3-pentafluoropropane), or any other suitable working fluid. The working fluid 160 is pressurized in a pump 130 and then passed through a valve 132. The valve 132 selectively directs the working fluid 160 to one or more of three heat exchangers 126, 134 and 136. The first heat exchanger 126 is the same heat exchanger used to precool the first working fluid 116 of the hot cycle 112 after it is expanded through the turbine 124. Thus, the heat source for the first heat exchanger 126 is the hot cycle 112. The second heat exchanger 134 uses the EGR system of the vehicle as a heat source. The third heat exchanger 136 is a recuperator, which recaptures heat from the second working fluid 160 after it has been expanded through a turbine 140. In response to information received from sensors that sense various parameters related to each potential heat source as described above, a controller controls the valve to direct the second working fluid 160 to the one or more heat exchangers that will most efficiently heat the working fluid.

The working fluid 160 exits the one or more heat exchangers 126, 134, and 136 and is superheated by another heat exchanger 138, which uses engine exhaust as a heat source. The superheated working fluid 160 is expanded through the turbine 140 to produce power P and then passed through the recuperator (heat exchanger 136) to serve as a potential heat source for working fluid 160 that has been compressed by the pump 130. The working fluid 160 is then condensed by a condenser 142 and returned to the pump 130 to start the cycle again.

It is noted that the function of each of the components that make up the heat recovery system 110 will generally determine where on the vehicle that component is located. In this regard, as shown in FIG. 2, in which different portions of the vehicle are labeled and separated by dashed lines, some components are located in the engine compartment of the vehicle, while others are located in a Rear Engine Power Take-off (REPTO) area. Still other components are positioned on the back of the vehicle cab. It should be appreciated that the component locations are exemplary only and should not be considered limiting. In this regard, the system components can be located at any suitable location on the vehicle; however, the location of each particular component will preferably be chosen to optimize the performance of the heat recovery system 110, while at the same time minimizing any negative impact on the performance of the other vehicle systems that are associated with the heat recovery system.

While illustrative embodiments have been illustrated and described, it will be appreciated that various changes can be made therein without departing from the spirit and scope of the invention.

The invention claimed is:

1. A dual cycle waste heat recovery system, comprising:
   (a) a high-temperature circuit, comprising:
      (i) a first working fluid;
      (ii) a first waste heat source, wherein the first working fluid is heated by the first waste heat source;
      (iii) a first expander, the first working fluid being expanded through the first expander to produce power; and
      (iv) a first sensor for sensing a temperature of the first working fluid, a pressure of the first working fluid, and a mass flow of the first working fluid; and
   (b) a low-temperature circuit, comprising:
      (i) a second working fluid;
      (ii) a first heat exchanger selectively heating the second working fluid, the first working fluid providing heat to the first heat exchanger;
      (iii) a second heat exchanger configured in parallel with the first heat exchanger, the second heat exchanger selectively heating the second working fluid, a second waste heat source comprising a flow of a heat source fluid providing heat to the second heat exchanger;
      (iv) a second sensor for sensing a temperature of the heat source fluid, a pressure of the heat source fluid, and a mass flow of the heat source fluid;
      (v) a control valve for selectively directing the second working fluid to the first and second heat exchangers;
      (vi) a controller determining a thermal load of the first working fluid according to the temperature, pressure, and mass flow of the first working fluid, the controller determining a thermal load of the heat source fluid according to the temperature, pressure, and mass flow of the heat source fluid; and
      (vii) a second expander, the second working fluid being expanded through the second expander to produce power, wherein the controller controls the control valve according to the thermal loads of the first working fluid and the heat source fluid to maximize the temperature of the second working fluid entering the second expander.

2. The system of claim 1, wherein the control valve directs at least a portion of the second working fluid to the first heat exchanger when the thermal load of the first working fluid is greater than the thermal load of the heat source fluid.

3. The system of claim 2, wherein the control valve directs at least a portion of the second working fluid to the second heat exchanger when the thermal load of the heat source fluid is greater than the thermal load of the first working fluid.

4. The system of claim 1, the low-temperature circuit further comprising a third heat exchanger for selectively heating the second working fluid with heat from a third waste heat source, wherein the control valve selectively controls the flow of the second working fluid to the first, second, and third heat exchangers.

5. The system of claim 1, wherein the control valve directs the second working fluid to bypass the second heat exchanger when the thermal load of the first working fluid is greater than the thermal load of the heat source fluid.

6. The system of claim 5, wherein the control valve directs the second working fluid to bypass the first heat exchanger when the thermal load of the heat source fluid is greater than the thermal load of the first working fluid.

7. A dual cycle waste heat recovery system, comprising:
   (a) a high-temperature circuit, comprising:
      (i) a first working fluid;
      (ii) a first waste heat source, wherein the first working fluid is heated by the first waste heat source;
      (iii) a first expander, the first working fluid being expanded through the first expander to produce power; and
      (iv) a first sensor for sensing a temperature of the first working fluid, a pressure of the first working fluid, and a mass flow of the first working fluid; and
   (b) a low-temperature circuit, comprising:
      (i) a second working fluid;
      (ii) a first heat exchanger selectively heating the second working fluid, the first working fluid providing heat to the first heat exchanger;
      (iii) a second heat exchanger configured in parallel with the first heat exchanger, the second heat exchanger selectively heating the second working fluid, a second waste heat source comprising a flow of a heat source fluid providing heat to the second heat exchanger, the heat source fluid being one of exhaust gas, engine oil, and engine coolant;
      (iv) a second sensor for sensing a temperature of the heat source fluid, a pressure of the heat source fluid, and a mass flow of the heat source fluid;
      (v) a control valve for selectively directing the second working fluid to the first and second heat exchangers;
      (vi) a controller determining a thermal load of the first working fluid according to the temperature, pressure, and mass flow of the first working fluid, the controller determining a thermal load of the heat source fluid according to the temperature, pressure, and mass flow of the heat source fluid; and
      (vii) a second expander, the second working fluid being expanded through the second expander to produce power, wherein the controller controls the control valve according to the thermal loads of the first working fluid and the heat source fluid to maximize the temperature of the second working fluid entering the second expander.

8. The system of claim 7, wherein the control valve directs at least a portion of the second working fluid to the first heat exchanger when the thermal load of the first working fluid is greater than the thermal load of the heat source fluid.

9. The system of claim 8, wherein the control valve directs at least a portion of the second working fluid to the second heat exchanger when the thermal load of the heat source fluid is greater than the thermal load of the first working fluid.

10. The system of claim 7, the low-temperature circuit further comprising a third heat exchanger for selectively heating the second working fluid with heat from a third waste heat source, wherein the control valve selectively controls the flow of the second working fluid to the first, second, and third heat exchangers.

11. The system of claim 7, wherein the control valve directs the second working fluid to bypass the second heat exchanger when the thermal load of the first working fluid is greater than the thermal load of the heat source fluid.

12. The system of claim 11, wherein the control valve directs the second working fluid to bypass the first heat exchanger when the thermal load of the heat source fluid is greater than the thermal load of the first working fluid.

* * * * *

UNITED STATES PATENT AND TRADEMARK OFFICE
CERTIFICATE OF CORRECTION

PATENT NO. : 9,046,006 B2  Page 1 of 1
APPLICATION NO. : 12/819904
DATED : June 2, 2015
INVENTOR(S) : J. Ritter It is certified that error appears in the above-identified patent and that said Letters Patent is hereby corrected as shown below:

| COLUMN | LINE | ERROR |
|---|---|---|
| On the Title Page (54) and in the Specification, Column 1 | Title | "DUAL CYCLE RANKINE W+ASTE HEAT RECOVERY CYCLE" should read<br><br>--DUAL CYCLE RANKINE WASTE HEAT RECOVERY CYCLE-- |

Signed and Sealed this
Second Day of February, 2016

Michelle K. Lee
*Director of the United States Patent and Trademark Office*